(12) United States Patent
Deng et al.

(10) Patent No.: US 12,356,955 B2
(45) Date of Patent: Jul. 15, 2025

(54) PET EXCREMENT COLLECTING DEVICE CAPABLE OF CLOSING EXCREMENT COLLECTING BAG

(71) Applicant: SHENZHEN XINGRISHENG INDUSTRIAL CO., LTD., Shenzhen (CN)

(72) Inventors: Yikang Deng, Shenzhen (CN); Chunyun Li, Shenzhen (CN); Xiuqi Li, Shenzhen (CN)

(73) Assignee: SHENZHEN XINGRISHENG INDUSTRIAL CO., LTD., Shenzhen (CN)

( * ) Notice: Subject to any disclaimer, the term of this patent is extended or adjusted under 35 U.S.C. 154(b) by 0 days.

(21) Appl. No.: 18/690,117

(22) PCT Filed: Sep. 8, 2021

(86) PCT No.: PCT/CN2021/117056
§ 371 (c)(1),
(2) Date: Mar. 7, 2024

(87) PCT Pub. No.: WO2023/035127
PCT Pub. Date: Mar. 16, 2023

(65) Prior Publication Data
US 2024/0381832 A1 Nov. 21, 2024

(51) Int. Cl.
*A01K 1/01* (2006.01)
(52) U.S. Cl.
CPC ................... *A01K 1/0117* (2013.01)

(58) Field of Classification Search
CPC .... A01K 1/0114; A01K 1/0117; A01K 1/011; B65B 2067/1283; B65F 1/062
See application file for complete search history.

(56) References Cited

U.S. PATENT DOCUMENTS

| 1,813,329 A | 7/1931 | Supplee |
| 4,120,264 A | 10/1978 | Carter |
| 5,272,999 A | 12/1993 | Nussle |

(Continued)

FOREIGN PATENT DOCUMENTS

| CN | 101554139 A | 10/2009 |
| CN | 104016042 A | 9/2014 |

(Continued)

*Primary Examiner* — Yvonne R Abbott-Lewis
(74) *Attorney, Agent, or Firm* — PROI Intellectual Property US

(57) ABSTRACT

A pet excrement collecting device capable of closing an excrement collecting bag, comprising a device body and a garbage collecting box. The garbage collecting box comprises a guide rail, a fixed pressing rod, a movable pressing rod, and at least one elastic buckle. An elastic rod is further provided in the device body, such that when the garbage collecting box is inserted into the device body, the elastic rod pushes the elastic buckle, the movable pressing rod can translate on the guide rail, and the movable pressing rod is buckled on the device body; when the garbage collecting box is extracted from the device body, the movable pressing rod can translate toward the fixed pressing rod on the guide rail; and when the garbage collecting box is taken out, the excrement collecting bag is in a fully closed state.

16 Claims, 8 Drawing Sheets

(56) References Cited

U.S. PATENT DOCUMENTS

| | | | |
|---|---|---|---|
| 5,662,066 A * | 9/1997 | Reitz | A01K 1/0114 |
| | | | 119/163 |
| 5,911,194 A | 6/1999 | Pierson, Jr. | |
| 6,202,595 B1 * | 3/2001 | Atcravi | A01K 1/0114 |
| | | | 119/165 |
| 9,433,186 B2 * | 9/2016 | Romano | A01K 1/0151 |
| 11,944,066 B2 * | 4/2024 | Ma | B07B 1/28 |
| 2013/0019568 A1 | 1/2013 | Gkinosatis | |

FOREIGN PATENT DOCUMENTS

| | | |
|---|---|---|
| CN | 204032023 U | 12/2014 |
| CN | 104969865 A | 10/2015 |
| CN | 105918141 A | 9/2016 |
| CN | 106305441 A | 1/2017 |
| CN | 106564717 A | 4/2017 |
| CN | 109264244 A | 1/2019 |
| CN | 110521611 A | 12/2019 |
| CN | 113163730 A | 7/2021 |
| TW | M385928 U | 8/2010 |

* cited by examiner

PET EXCREMENT COLLECTING DEVICE CAPABLE OF CLOSING EXCREMENT COLLECTING BAG

TECHNICAL FIELD

The invention relates to an animal feeding device, in particular to a device for providing a defecation place for pets and automatically collecting their excrement.

BACKGROUND ART

In the prior art, a pet excrement collecting device comprises an excrement cleaning mechanism and a garbage storage bin. The garbage storage bin is sleeved with the excrement collecting bag and then is arranged in the pet excrement collecting device, and the excrement cleaning mechanism can throw removed excrement into the excrement collecting bag of the garbage storage bin. In the prior art, excrement is removed by taking out a garbage storage bin regularly and replacing an excrement collecting bag. In the process of taking out the garbage storage bin and replacing the excrement collecting bag, the excrement collecting bag is in an open state before the bag is sealed and closed, and the operator tidies and closes the bag, facing the exposed pet excrement. In the process, the odor of the exposed pet excrement and the bacteria in the pet excrement are easily emitted into the air and can be inhaled by the operator in a short distance, thereby resulting in poor environmental sanitation conditions, threatening the health of the cleaning operator, causing the hidden danger of bacteria transmission, and bringing the poor experience to the users.

SUMMARY OF THE INVENTION

The technical solution in the present invention is to provide a pet excrement collecting device capable of ensuring that the excrement collecting bag is sealed properly when the garbage storage bin is taken out, so as to avoid the defects of the prior art.

A pet excrement collecting device capable of sealing an excrement collecting bag is designed and manufactured, which comprises a principal body, an excrement cleaning mechanism arranged in the principal body, and a garbage collecting bin detachably arranged in the principal body. The garbage collecting bin is detachably provided with an excrement collecting bag. The excrement cleaning mechanism can throw removed excrement into an excrement collecting bag of the garbage collecting bin; the excrement collecting bag can be replaced by drawing out the garbage collecting bin from the principal body. In particular, the garbage collecting bin comprises a guide rail, a fixed pressing rod arranged at the tail end of the guide rail, a movable pressing rod capable of moving horizontally along the guide rail, and at least one elastic buckle; the guide rail is arranged along the directions of drawing, inserting, disassembling and assembling the garbage collecting bin from/in the principal body, and the elastic buckle is arranged at the front part of the garbage collecting bin and can buckle the movable pressing rod which has moved to the front end of the guide rail, with the front end of the guide rail. The edge of the opening of the excrement collecting bag which is arranged in the garbage collecting bin is detachably arranged between the movable pressing rod and the fixed pressing rod so that the excrement collecting bag is in a completely opened state when the movable pressing rod is positioned at the front end of the guide rail, and the excrement collecting bag is in a completely closed state by means of the movable pressing rod and the fixed pressing rod, which are clamped together when the movable pressing rod is horizontally moved to the tail end of the guide rail. An elastic rod is also installed in the principal body so that when the garbage collecting bin provided with the excrement collecting bag in a fully opened state is inserted into the principal body, the elastic rod pushes and presses the elastic buckle, then the movable pressing rod can horizontally move along the guide rail and is buckled on the principal body; therefore, when the garbage collecting bin is drawn out from the principal body, the movable pressing rod can horizontally move along the guide rail toward the fixed pressing rod; further, when the garbage collecting bin is taken out, the excrement collecting bag is in a completely closed state.

To lock the movable pressing rod, the end part of the movable pressing rod is provided with a buckling groove, the buckling groove comprises a front groove wall and a rear groove wall, and the lower end of the rear groove wall is higher than the lower end of the front groove wall, thereby forming a lower groove opening positioned at the lower end of the buckling groove and a rear groove opening positioned at the rear end of the buckling groove between the front groove wall and the rear groove wall, and the lower groove opening is inter-connected with the rear groove opening. The elastic buckle is a lug boss which is driven by an elastic device to reciprocate upward and downward, and the elastic buckle is provided with a first guiding inclined surface that inclines to the lower rear. When the movable pressing rod is horizontally moved to the front end of the guide rail, the elastic buckle is clamped into the buckling groove, and the movable pressing rod is clamped at the front end of the guide rail and cannot be horizontally moved along the guide rail by means of the blockage of the elastic buckle on the front groove wall.

In order to prevent the movable pressing rod from displacing relative to the principal body after being unlatched, the elastic rod comprises a first elastic rod and a second elastic rod positioned above the first elastic rod. The first elastic rod is provided with a second guiding inclined surface which is inclined forwards. The second elastic rod is provided with a third guiding inclined surface which is inclined forwards. When the garbage collecting bin provided with the excrement collecting bag in a fully opened state is inserted into the principal body, the elastic rod is inserted into the buckle groove through the rear groove opening by virtue of the second guiding inclined surface and the third guiding inclined surface, the first elastic rod presses the elastic buckle by virtue of the first guiding inclined surface, the elastic buckle is separated from the buckling groove, and the movable pressing rod can horizontally move along the guide rail; the movable pressing rod is buckled on the principal body through the second elastic rod being clamped into the rear groove wall of the buckling groove.

In order to facilitate the insertion and removal of the garbage collecting bin, the garbage collecting bin also comprises a separate push block. The separating push block comprises a front guiding inclined surface, a rear guiding inclined surface and a supporting surface, wherein the front guiding inclined surface is obliquely arranged forwards, the rear guiding inclined surface is obliquely arranged backwards, and the supporting surface is arranged between the front guiding inclined surface and the rear guiding inclined surface. The first elastic rod is further provided with a fourth guiding inclined surface inclined backwards and a bearing surface arranged between the second guiding inclined surface and the fourth guiding inclined surface. When the garbage collecting bin is drawn out of the principal body, the movable pressing rod horizontally moves along the guide rail toward the fixed pressing rod until the excrement collecting bag is in a completely closed state, and then the supporting surface of the separating push block slides to the bearing surface of the first elastic rod through the fourth guiding inclined surface and the front guiding inclined surface, so that the elastic rod is propped and taken out of the buckling groove, therefore the garbage collecting bin can be completely drawn out of the principal body. When the garbage collecting bin is inserted into the principal body, the support surface of the separating push block slides to the bearing surface of the first elastic rod through the second guiding inclined surface and the rear guide incline surface, and the elastic rod is propped and opened by the separating push block, so that the garbage collecting bin can be smoothly inserted into the principal body.

In order to prevent that movable pressing rod from moving toward the fixed pressing rod in the principal body, the principal body also comprises at least one baffle plate. When the garbage collecting bin is inserted into the principal body, the baffle plate is positioned behind the movable pressing rod and can prevent the movable pressing rod from horizontally moving towards the fixed pressing rod.

In particular, the garbage collecting bin comprises two elastic buckles which are respectively arranged on two sides of the front part of the garbage collecting bin. The garbage collecting bin comprises two separating push blocks which are respectively arranged on two sides of the rear part of the garbage collecting bin. The two ends of the movable pressing rod are respectively provided with the buckling groove. The principal body comprises two elastic rods which are respectively arranged on two side walls of a chamber for carrying the garbage collecting bin in the principal body.

In order to fix the excrement collecting bag, at least two positioning & fixing screws are arranged on the movable pressing rod. At least two positioning & fixing screws are arranged on the fixed pressing rod. The opening of the excrement collecting bag is provided with positioning through holes in the quantity equivalent to that of the positioning & fixing screws. The opening edge of the excrement collecting bag is detachably arranged on the movable pressing rod and the fixed pressing rod by means of the positioning through hole sleeved on the positioning & fixing screw, so that the excrement collecting bag is detachably arranged in the garbage collecting bin.

In order to ensure that the garbage collecting bag is in a completely closed state, the garbage collecting bin also comprises at least one magnetic assembly. The magnetic assembly comprises a first magnetic member and a second magnetic member which can be mutually attracted together through magnetic force. One of the movable pressing rod and the fixed pressing rod is provided with a first magnetic member, and the other is provided with a second magnetic member. When the garbage collecting bin is removed from the principal body, the movable pressing rod horizontally moves along the guide rail towards the fixed pressing rod until the excrement collecting bag is in a completely closed state; the excrement collecting bag can be in the completely closed state by means of the magnetic assembly.

In order to facilitate sealing and replacement, at least one self-adhesive tape is arranged on that excrement collecting bag. After the excrement collecting bag in a completely closed state is dismounted from the garbage collecting bin, the excrement collecting bag is rolled from the closed opening to the position where the self-adhesive tape is arranged, and the excrement collecting bag is sealed by the self-adhesive tape.

In particular, the pet excrement collecting device comprises a cat toilet and a dog toilet.

Compared with the prior art, the pet excrement collecting device capable of sealing the excrement collecting bag in the present invention has the following technical effects:

When the excrement collecting bag needs to be replaced, the opening of the excrement collecting bag can be properly sealed after the garbage collecting bin is taken out, by means of the sealing effect of the movable pressing rod and the fixed pressing rod, and the opening can remain sealed and closed in the whole process of replacing the excrement collecting bag, thereby preventing the odor of excrement and bacteria in the excrement from being emitted into the air, maintaining the environmental sanitation conditions, reducing the possibility of disease transmission, and optimizing users' experience.

DESCRIPTION OF EMBODIMENTS

The preferred embodiment of the present invention is hereby described in detail with reference to the accompanying figures.

Figure 1:
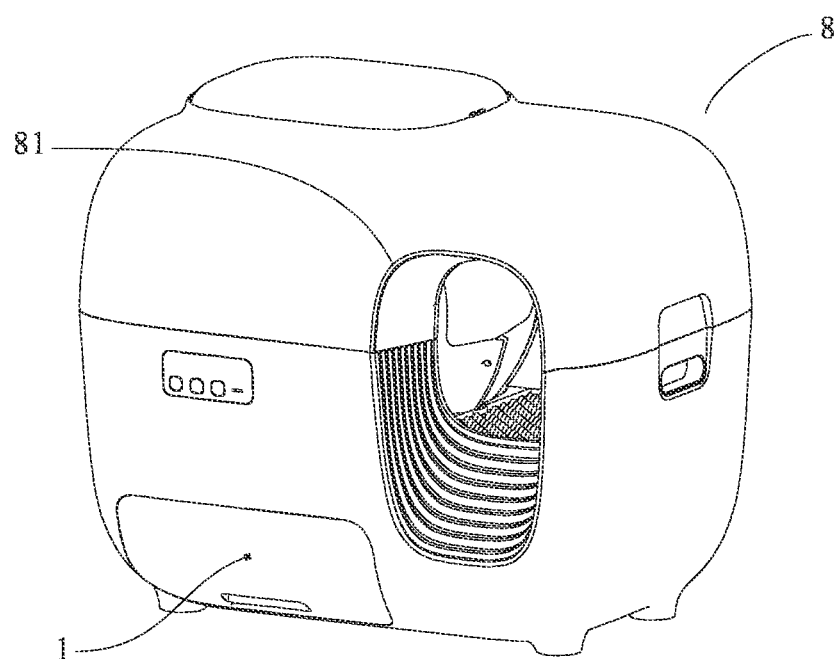
FIG. 1 is an axonometric view of a preferred embodiment of a pet excrement collecting device capable of sealing an excrement collecting bag according to the present invention.
Figure 2:
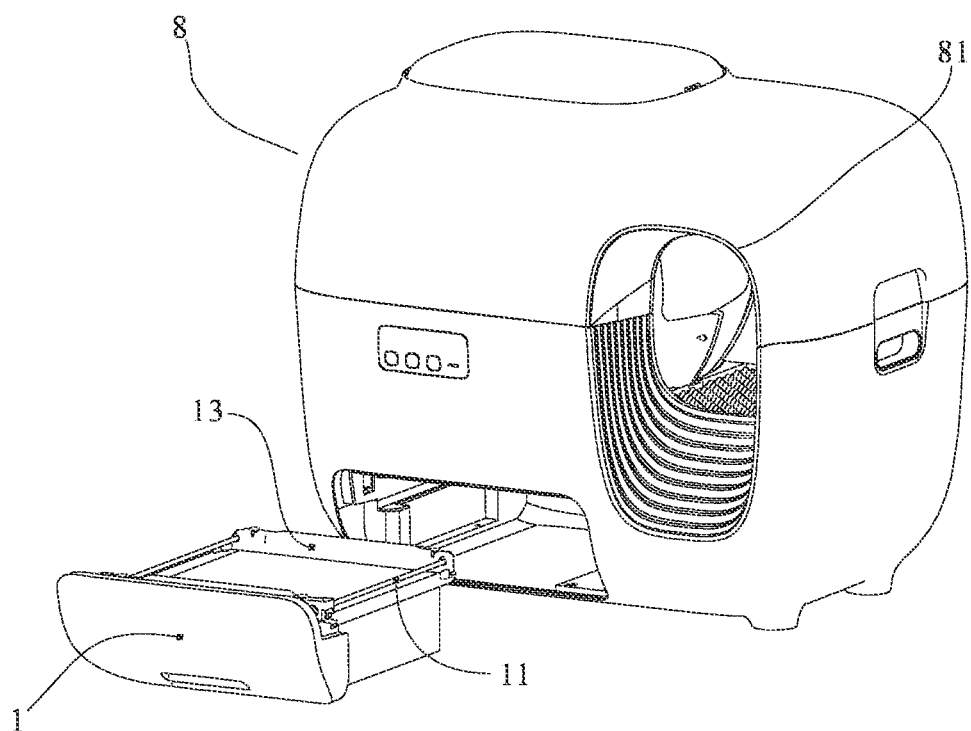
FIG. 2 is an axonometric explosive view of drawing out the garbage collecting bin 1 in the preferred embodiment.
Figure 3:
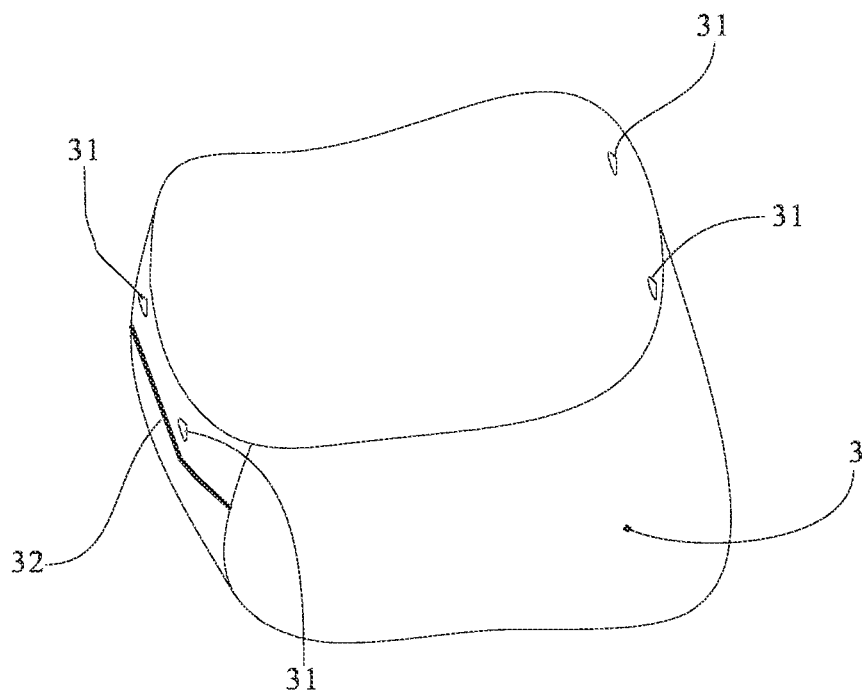
FIG. 3 is an axonometric view of the excrement collecting bag 3 in the preferred embodiment.
Figure 4:
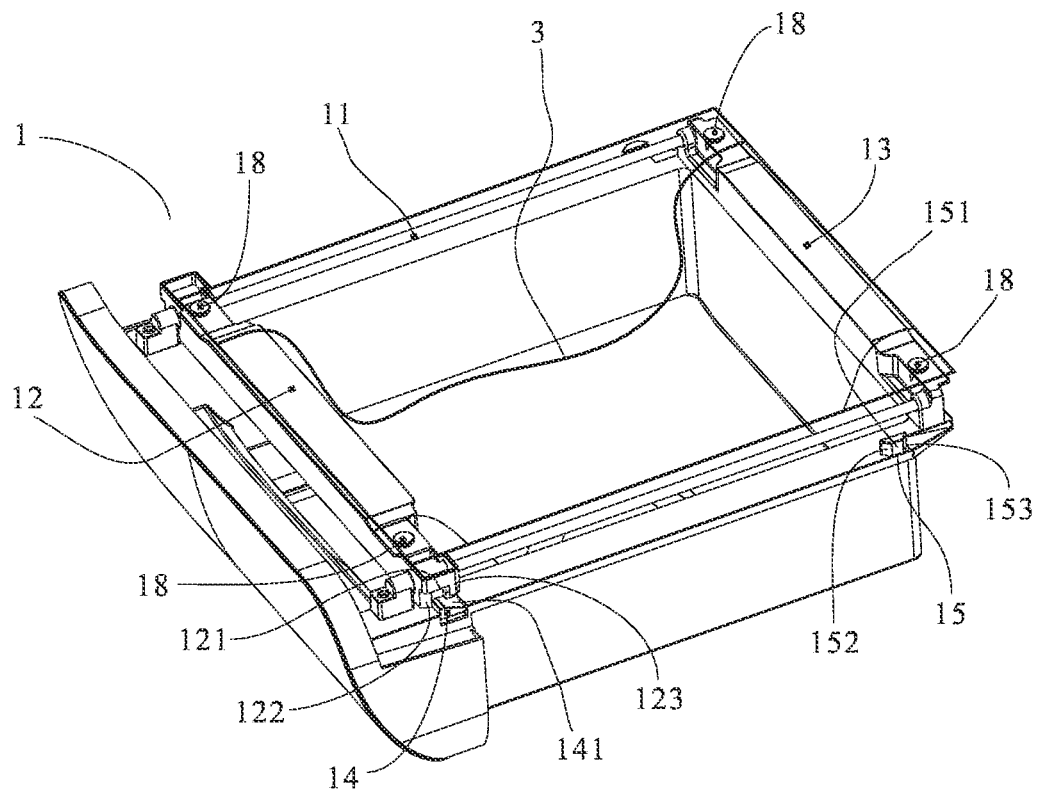
FIG. 4 is an axonometric view of the garbage collecting bin 1 fitted with the excrement collecting bag 3 in the preferred embodiment.
Figure 5:
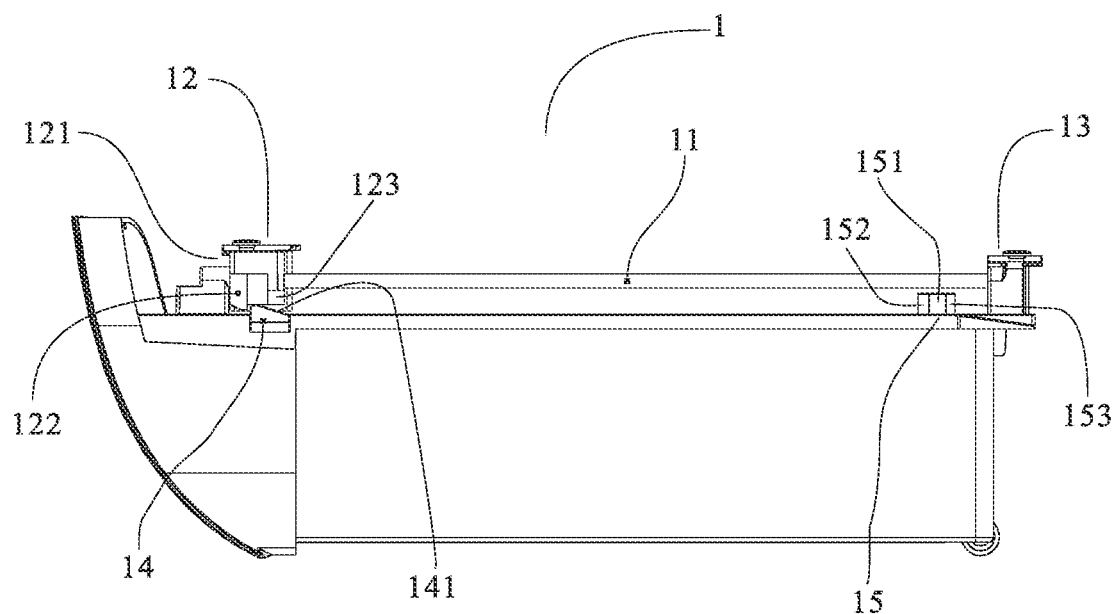
FIG. 5 is an orthographic right-side view of the garbage collecting bin 1 in the preferred embodiment.
Figure 6:
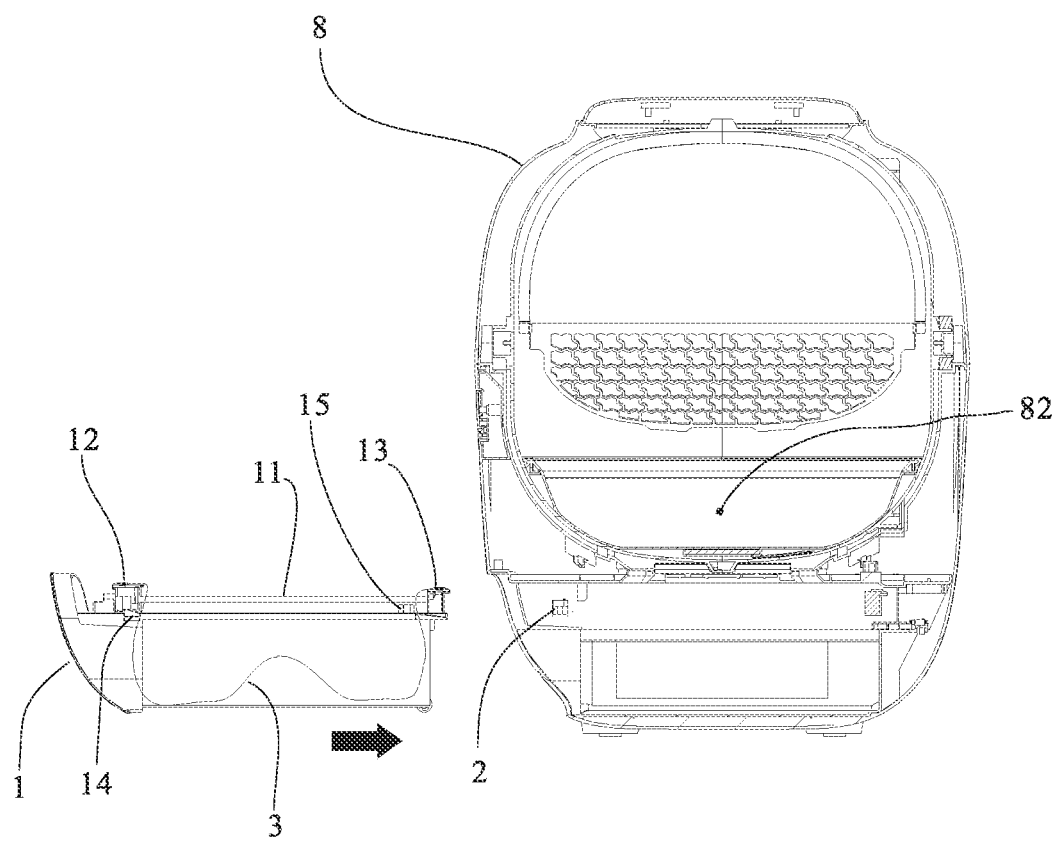
FIG. 6 is an orthographic right sectional view of the garbage collecting bin 1 installed into the principal body 8 in the preferred embodiment.

The present invention provides a pet excrement collecting device capable of sealing an excrement collecting bag, as shown in FIG. 1, FIG. 2 and FIG. 6, comprising a principal body 8, an excrement cleaning mechanism 82 arranged in the principal body 8, and a garbage collecting bin 1 detachably mounted in the principal body 8. The pet excrement collecting device comprises a cat toilet and a dog toilet, and the preferred embodiment of the invention takes the cat toilet as an example. The principal body 1 is provided with a pet entrance/exit 81. The garbage collecting bin 1 is detachably attached with an excrement collecting bag 3. The excrement cleaning mechanism 82 can put the removed excrement 9 into the excrement collecting bag 3 of the garbage collecting bin 1. The excrement collecting bag 3 can be replaced by pulling out the garbage collecting bin 1 from the principal body 8. As shown in FIG. 4 and FIG. 5, the garbage collecting bin 1 comprises a guide rail 11, a fixed pressing rod 13 arranged at the rear end of the guide rail 11, a movable pressing rod 12 capable of horizontally moving along the guide rail 11, and at least one elastic buckle 14. The fixed pressing rod 13 is fixedly connected to the end of the guiding rail 11. In the present invention, the obverse side of the principal body 8 is the front side, and the back side of the principal body 8 is the rear side. The guide rail 11 is arranged along the direction of the garbage collecting bin 1 being inserted and disassembled in the principal body 8, and the elastic buckle 14 is arranged at the front part of the garbage collecting bin 1, so that the movable pressing rod 12 which horizontally moves to the front end of the guide rail 11 can be buckled at the front end of the guide rail 11. The opening edge of the excrement collecting bag 3 loaded into the garbage collecting bin 1 is detachably installed between the movable pressing rod 12 and the fixed pressing rod 13, so that when the movable pressing rod 12 is located at the front end of the guide rail 11, the excrement collecting bag 3 is in a completely opened state, and when the movable pressing rod 12 is horizontally moved to the end of the guide rail 11, the excrement collecting bag 3 is in a completely closed state by means of the movable pressing rod 12 and the fixed pressing rod 13 that have been fully clamped together. As shown in FIG. 6 to FIG. 11, the principal body 8 is further provided with an elastic rod 2, so that when the garbage collecting bin 1 with the excrement collecting bag 3 in a fully opened state is inserted into the principal body 8, the elastic rod 2 pushes the elastic buckle 14, so that the movable pressing rod 12 horizontally moves along the guide rail 11 and is buckled on the principal body 8, so that when the garbage collecting bin 1 is pulled out from the principal body 8, the movable pressing rod 12 horizontally moves along the guide rail 11 towards the fixed pressing rod 13, and so that the excrement collecting bag 3 is in a completely closed state when the garbage collecting bin 1 is removed.

When the excrement collecting bag 3 needs to be replaced, the opening of the excrement collecting bag 3 can be properly sealed after the garbage collecting bin 1 is taken out, through the sealing effect of the movable pressing rod 12 and the fixed pressing rod 13, and the opening can be in a sealed state in the whole process of replacing the excrement collecting bag 3, thereby preventing the odor of excrement and bacteria in the excrement from being emitted into the air, maintaining the environmental sanitation conditions, reducing the possibility of disease transmission, and optimizing users' experience.

Figure 9:
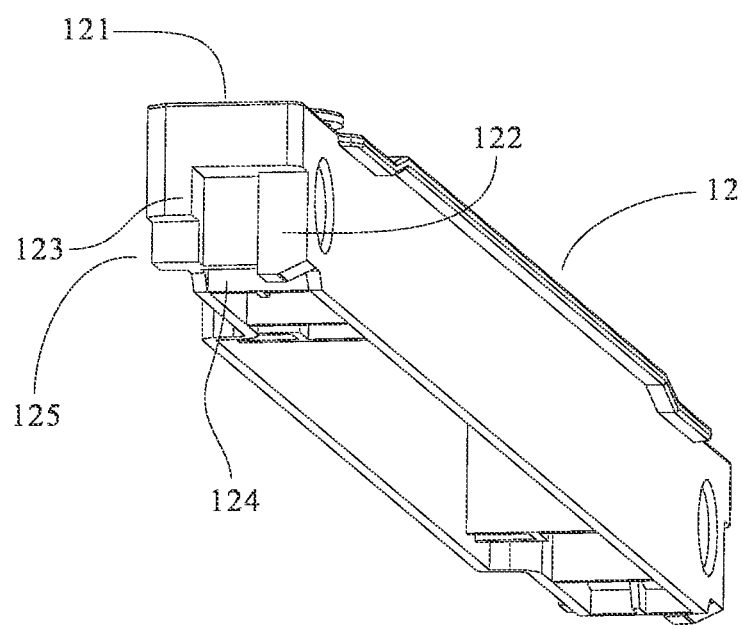
FIG. 9 is an axonometric view of the movable pressing rod 12 in the preferred embodiment in the main view, bottom view and left view.

According to a preferred embodiment of the present invention, in order to realize that the movable pressing rod 12 can be buckled at the front end of the guide rail 11 without movement when the garbage collecting bin 1 is not installed into the principal body 8, as shown in FIG. 4, FIG. 5 and FIG. 9, the end of the movable pressing rod 12 is provided with a buckling groove 121, the buckling groove 121 comprises a front groove wall 122 and a rear groove wall 123, the lower end of the rear groove wall 123 is higher than the lower end of the front groove wall 122, Thus, a lower groove opening 124 located at the lower end of the buckling groove 121 and a rear groove opening 125 located at the rear end of the buckling groove 121 are formed between the front groove wall 122 and the rear groove wall 123, and the lower groove opening 124 and the rear groove opening 125 are inter-connected to form a groove opening. The elastic buckle 14 is a lug boss driven by an elastic device to reciprocate upward and downward. The elastic buckle 14 is fitted with a first guiding inclined surface 141 which is inclined backward and downward. When the movable pressing rod 12 is horizontally moved to the front end of the guide rail 11, the elastic buckle 14 is clamped into the buckling groove 121, and the movable pressing rod 12 is clamped at the front end of the guide rail 11 and cannot be horizontally moved along the guide rail 11 due to the blocking effect of the elastic buckle 14 on the front groove wall 122, to ensure that when the movable pressing rod 12 is horizontally moved to the front end of the guide rail 11, as shown in FIG. 4, the excrement collecting bag 3 mounted on the movable pressing rod 12 and the fixed pressing rod 13 is in a fully opened state.

Figure 7:
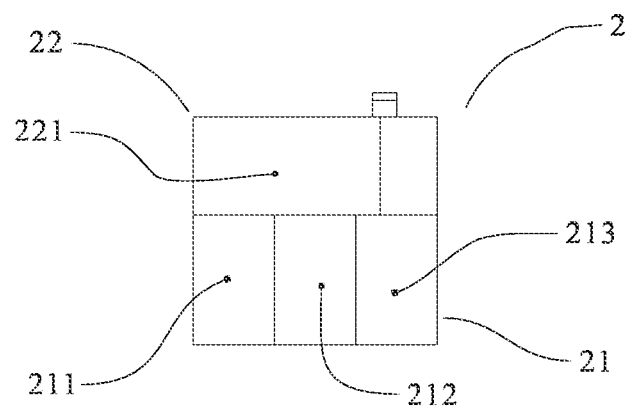
FIG. 7 is an orthographic right view of the elastic rod 2 arranged on the left side of the garbage collecting bin 1 in the preferred embodiment.
Figure 8:
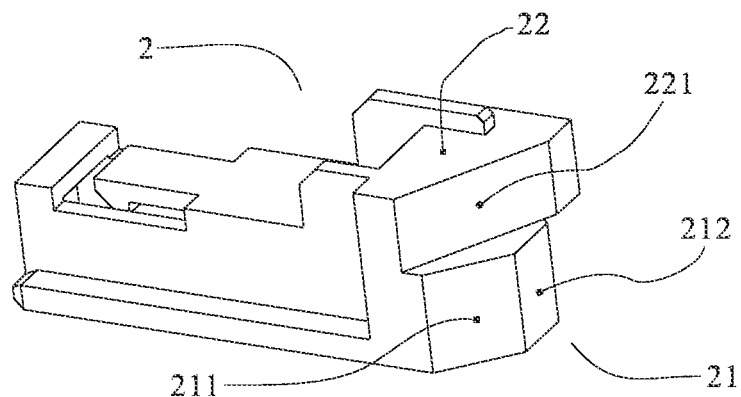
FIG. 8 is an axonometric view of the elastic rod 2 arranged on the left side of the garbage collecting bin 1 according to the preferred embodiment.
Figure 11:
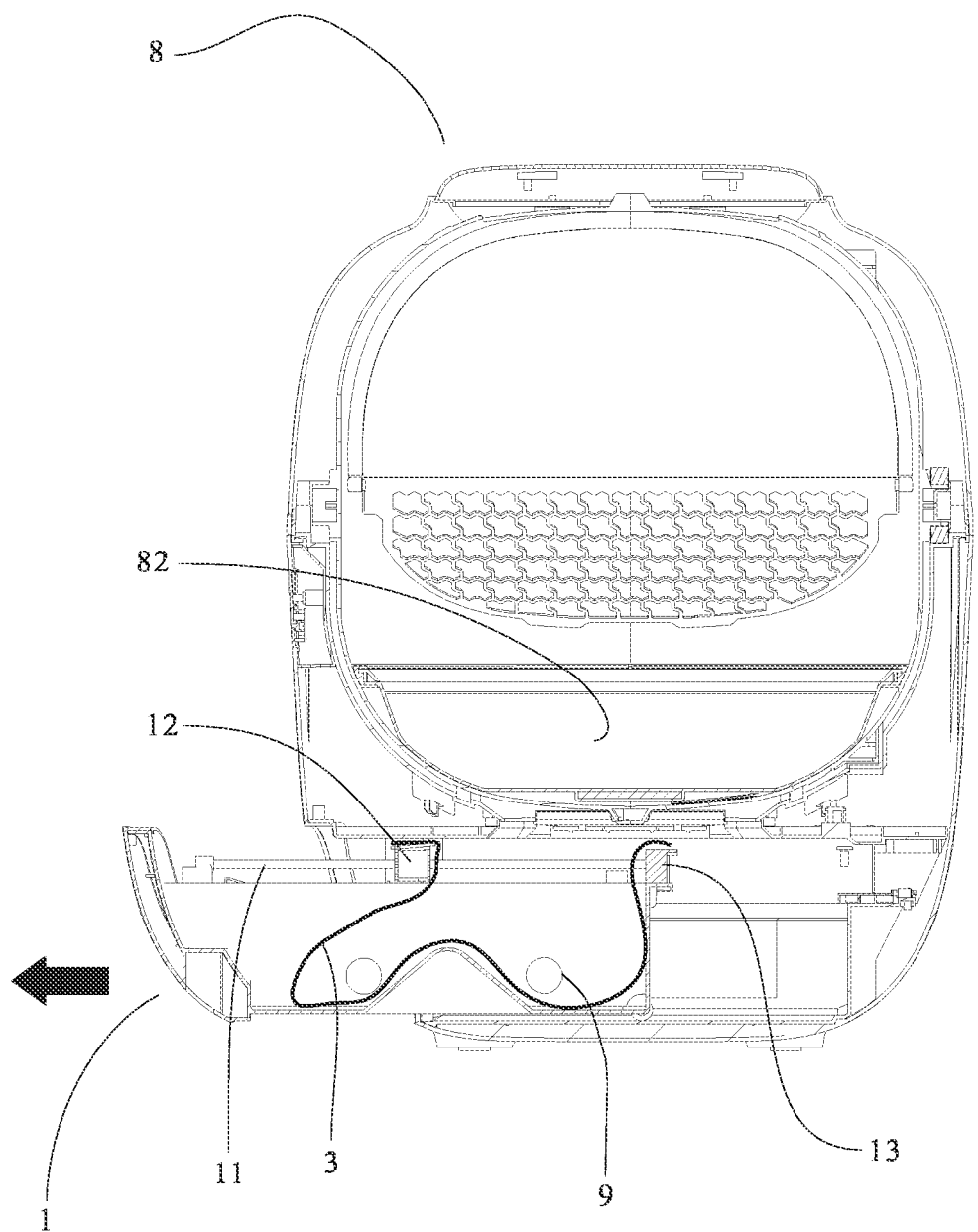
FIG. 11 is an orthographic right sectional view of the drawing out garbage collecting bin 1 in the preferred embodiment.
Figure 12:
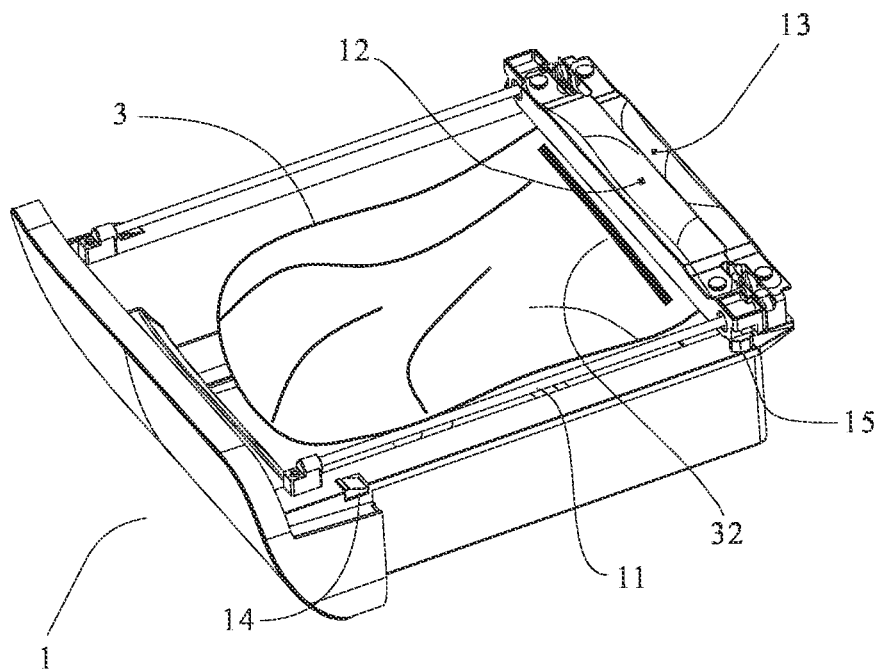
FIG. 12 is an axonometric view of the garbage collecting bin 1 in the preferred embodiment, which is drawn out from the principal body 8 and the excrement collecting bag 3 is in a completely closed state.
Figure 13:
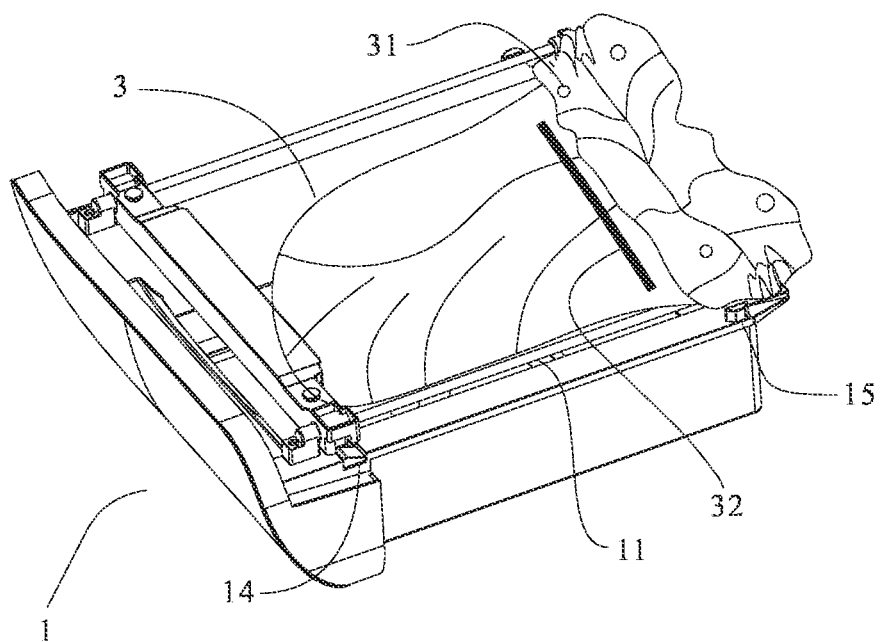
FIG. 13 is an axonometric view of the excrement collecting bag 3 in a completely closed state removed from the garbage collecting bin 1 in the preferred embodiment.
Figure 14:
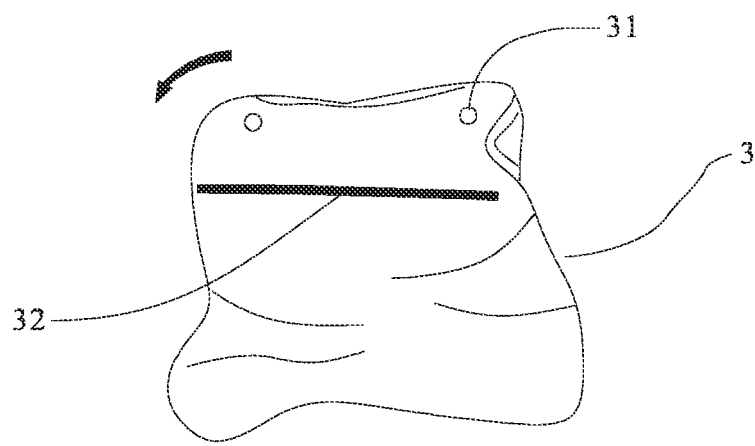
FIG. 14 is an axonometric view of the excrement collecting bag 3 removed in a completely closed state in the preferred embodiment.
Figure 15:
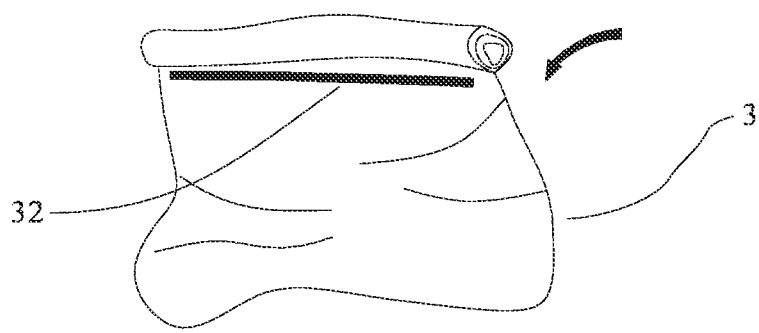
FIG. 15 is an axonometric view of the excrement collecting bag 3 removed in a completely closed state in the preferred embodiment, which opening is fully rolled.
Figure 16:
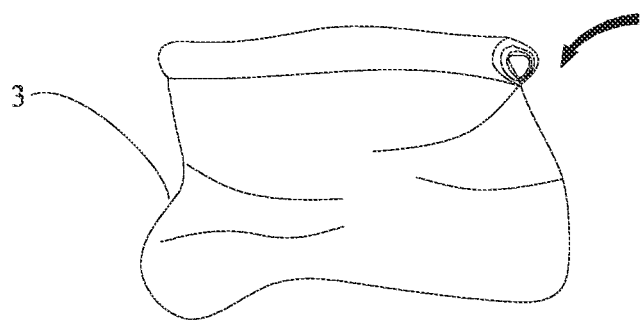
FIG. 16 is an axonometric view of the completed sealed excrement collecting bag 3 in the preferred embodiment.

In a preferred embodiment of the present invention, in order to realize that when the garbage collection bin 1 is inserted into the principal body 8, the elastic buckle 14 is unbuckled, and the movable pressing rod 12 can horizontally move along the guide rail 11, and in order to fix the movable pressing rod 12 horizontally moving on the guide rail 11, with the principal body 8 without relative displacement, in the subsequent process of pulling out the garbage collection bin 1, as shown in FIGS. 7 to 9, the elastic rod 2 comprises a first elastic rod 21, and a second elastic rod 22 located above the first elastic rod 21. The first elastic rod 21 is equipped with a second guiding inclined surface 211. The second elastic rod 22 is equipped with a third guiding inclined surface 221. When the garbage collecting bin 1 with the excrement collecting bag 3 in the fully opened state is inserted into the principal body 8, the elastic rod 2 is inserted into the buckling groove 121 from the rear groove opening 125 by means of the second guiding inclined surface 211 and the third guiding inclined surface 221, the first elastic rod 21 presses the elastic buckle 14 downward by means of the first guiding inclined surface 141, and the elastic buckle 14 is disengaged from the buckling groove 121, so that the movable pressing rod 12 can horizontally move along the guide rail 11. At the same time, because the elastic rod 2 is arranged in the principal body 8, the movable pressing rod 12 is clamped on the principal body 8 by the second elastic rod 22 being locked into the rear groove wall 123 of the buckling groove 121, so that the movable pressing rod 12 cannot be displaced relative to the principal body 8. As shown in FIG. 11, when the garbage collecting bin 1 is drawn out from the principal body 8, the movable pressing rod 12 will not be displaced relative to the principal body 8 along with the drawn garbage collecting bin 1, which ensures that the opening of the excrement collecting bag 3 will not be exposed at the time of the drawing out of the garbage collecting bin 1, and also ensures that the movable pressing rod 12 can smoothly horizontally move towards the fixed pressing rod 13 during this process. The opening of the excrement collecting bag 3 is gradually narrowed until it is completely closed.

In a preferred embodiment of the present invention, in order to ensure that the elastic rod 2 does not hinder the garbage collecting bin 1 from being completely drawn out from the principal body 8, and also to ensure that the garbage collecting bin 1 can be smoothly inserted into the principal body 8, as shown in FIGS. 4 to 8, the garbage collecting bin 1 further comprises a separating push block 15. The separating push block 15 includes a front guiding inclined surface 152, a rear guiding inclined surface 153, and a supporting surface 151 between the front guiding inclined surface 152 and the rear guiding inclined surface 153. The first elastic rod 21 is further equipped with a fourth inclined guiding surface 213 and a bearing surface 212 between the second inclined guiding surface 211 and the fourth inclined guiding surface 213. In the process of drawing the garbage collecting bin 1 out of the principal body 8, after the movable pressing rod 12 horizontally moves on the guide rail 11 toward the fixed pressing rod 13 until the excrement collecting bag 3 is in a completely closed state, the supporting surface 151 of the separating push block 15 slides to the pressure bearing surface 212 of the first elastic rod 21 by means of the fourth guiding inclined surface 213 and the front guiding inclined surface 152, and the elastic rod 2 is pushed out of the buckling groove 121, so that the garbage collecting bin 1 can be completely drawn out of the principal body 8. When the garbage collecting bin 1 is inserted into the principal body 8, the supporting surface 151 of the separating push block 15 slides to the pressure surface 212 of the first elastic rod 21 by means of the second guiding inclined surface 211 and the rear guiding inclined surface 153, and the elastic rod 2 is propped by the separating push block 15, so that the garbage collecting bin 1 can be smoothly inserted into the principal body 8.

Figure 10:
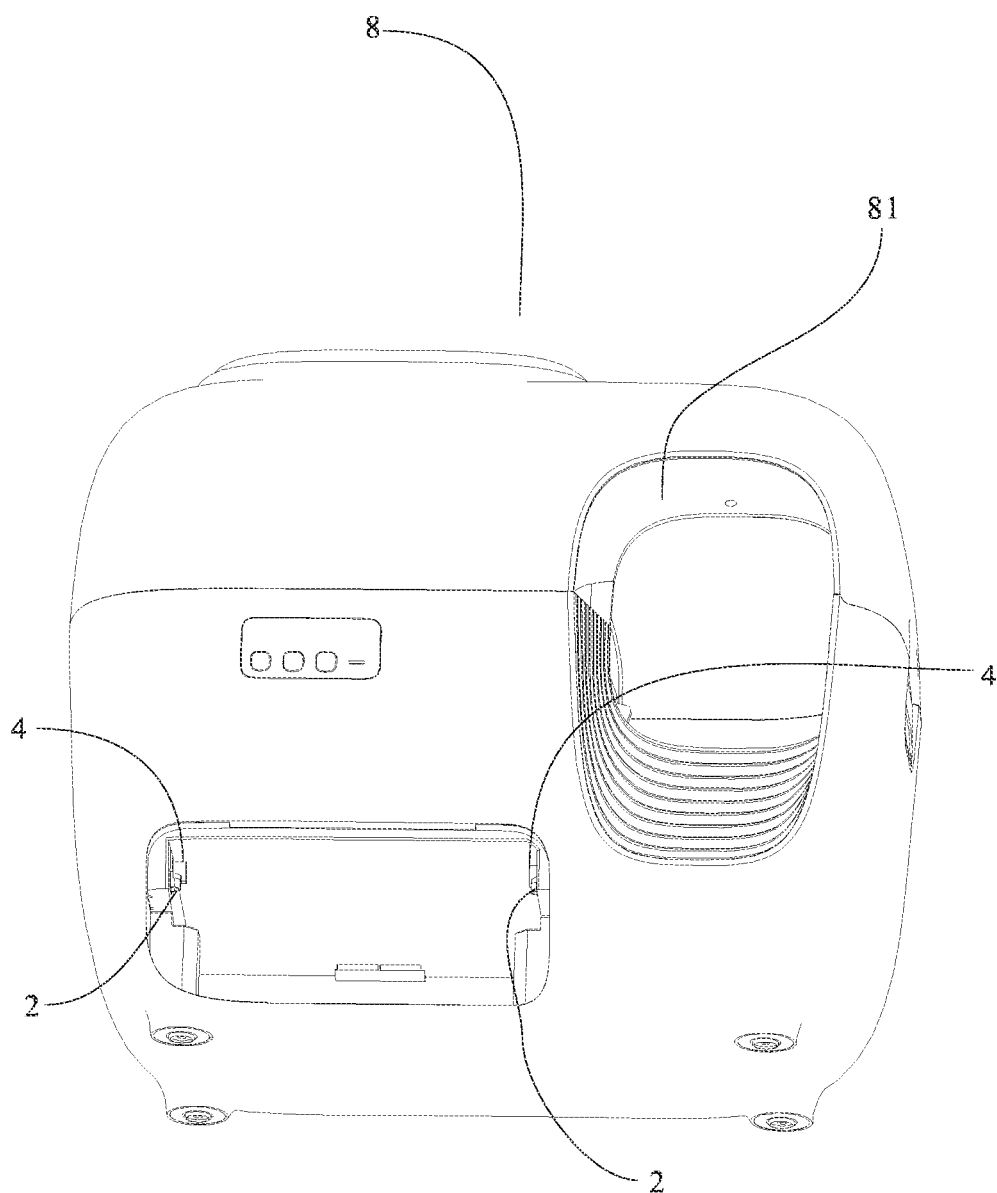
FIG. 10 is an axonometric view of the garbage collecting bin 1 removed in the preferred embodiment.

According to a preferred embodiment of the present invention, in order to prevent the unlocked movable pressing rod 12 from horizontally moving on the guide rail 11 towards the fixed pressing rod 13 during the insertion of the garbage collecting bin 1 into the principal body 8, as shown in FIG. 10, the principal body 8 further comprises at least one baffle plate 4. When the garbage collecting bin 1 is inserted into the principal body 8, the baffle plate 4 is located behind the movable pressing rod 12, and can prevent the movable pressing rod 12 from horizontally moving towards the fixed pressing rod 13 when the garbage collecting bin 1 is located in the principal body 8.

According to a preferred embodiment of the present invention, as shown in FIGS. 1 to 13, the garbage collecting bin 1 comprises two elastic buckles 14, which are respectively arranged at two sides of the front part of the garbage collecting bin 1. The garbage collecting bin 1 comprises two separate push blocks 15, which are respectively arranged on two sides of the rear part of the garbage collecting bin 1. Two ends of the movable pressing rod 12 are respectively provided with the buckling groove 121. The principal body 8 comprises two elastic rods 2, which are respectively arranged on two side walls of the chamber of the principal body 8 for carrying the garbage collecting bin 1.

In a preferred embodiment of the present invention, in order to detachably mount the excrement collecting bag 3 on the movable pressing rod 12 and the fixed pressing rod 13, as shown in FIG. 3, FIG. 4, FIG. 12, and FIG. 13, at least two positioning & fixing screws 18 are arranged on the movable pressing rod 12 and at least two positioning & fixing screws 18 are arranged on the fixed pressing rod 13. Positioning through holes 31, the number of which is equal to that of the positioning & fixing screws 18, are provided at the opening of the excrement collecting bag 3. The opening edge of the excrement collecting bag 3 is detachably mounted on the movable pressing rod 12 and the fixed pressing rod 13 by means of the positioning through holes 31 sleeved on the positioning & fixing screws 18. The positioning & fixing screw 18 comprises a screw rod connected to the movable pressing rod 12 or the fixed pressing rod 13, and a screw cap arranged on the top of the screw rod, the diameter of the screw cap is larger than that of the screw rod, and the positioning through hole 31 is sleeved on the positioning & fixing screw 18, that is, the positioning through hole 31 of the excrement collecting bag 3 is sleeved on the screw rod of the positioning & fixing screw 18 and is clamped by the screw cap so that the screw rod cannot be separated. The bag bottom of the excrement collecting bag 3 is placed between the movable pressing rod 12 and the fixed pressing rod 13, so that the excrement collecting bag 3 is detachably installed in the garbage collecting bin 1.

In a preferred embodiment of the present invention, in order to ensure that the excrement collecting bag 3 is in a completely closed state, the garbage collecting bin 1 further comprises at least one magnetic assembly. The magnetic assembly comprises a first magnetic member and a second magnetic member which can be mutually attracted together through magnetic force. One of the movable pressing rod 12 and the fixed pressing rod 13 is provided with a first magnetic member, and the other is provided with a second magnetic member. In the process of drawing out the garbage collecting bin 1 from the principal body 8, the movable pressing rod 12 horizontally moves along the guide rail 11 toward the fixed pressing rod 13 until the excrement collecting bag 3 is in a completely closed state, and the movable pressing rod 12 is attracted with the fixed pressing rod 13 by the magnetic assembly to ensure that the excrement collecting bag 3 is in a completely closed state.

In a preferred embodiment of the present invention, as shown in FIG. 3 and FIGS. 14 to 16, at least one self-adhesive tape 32 is arranged on the excrement collecting bag 3 for easy sealing and replacement. A protective tape is arranged on the adhesive surface of the self-adhesive tape 32 to prevent the adhesive surface from contacting the articles that do not need to be adhered. After the excrement collecting bag 3 in the completely closed state is dismounted from the garbage collecting bin 1, the excrement collecting bag 3 is rolled up from the closed bag opening to the position where the self-adhesive tape 32 is arranged, the protective tape on the surface of the self-adhesive tape 32 is removed, and the excrement collecting bag 3 is properly sealed through the self-adhesive tape 32.

The invention claimed is:

1. A pet excrement collecting device capable of sealing an excrement collecting bag comprises a principal body, an excrement cleaning mechanism arranged in the principal body, and a garbage collecting bin detachably arranged in the principal body; the garbage collecting bin is detachably attached with an excrement collecting bag; the excrement cleaning mechanism can put removed excrement into the excrement collecting bag of the garbage collecting bin; the excrement collecting bag can be replaced by drawing out the garbage collecting bin from the principal body; characterized in that:

the garbage collecting bin comprises a guide rail, a fixed pressing rod arranged at the rear end of the guide rail, a movable pressing rod capable of moving horizontally along the guide rail, and at least one elastic buckle;

the guide rail is arranged along the directions of the garbage collecting bin being inserted and disassembled in the principal body, and elastic buckle is arranged at the front part of the garbage collecting bin, so that the movable pressing rod which horizontally moves to the front end of the guide rail can be buckled at the front end of the guide rail;

the edge of the opening of the excrement collecting bag which is arranged in the garbage collecting bin is detachably installed between the movable pressing rod and the fixed pressing rod so that the excrement collecting bag is in a completely opened state when the movable pressing rod is positioned at the front end of the guide rail, and the excrement collecting bag is in a completely closed state by means of the movable pressing rod and the fixed pressing rod, which are clamped together when the movable pressing rod is horizontally moved to the rear end of the guide rail;

an elastic rod is also installed in the principal body so that when the garbage collecting bin provided with the excrement collecting bag in a fully opened state is inserted into the principal body, the elastic rod pushes and presses the elastic buckle, then the movable pressing rod can horizontally move along the guide rail and is buckled on the principal body; therefore, when the garbage collecting bin is drawn out from the principal body, the movable pressing rod can horizontally move along the guide rail toward the fixed pressing rod; further, when the garbage collecting bin is taken out, the excrement collecting bag is in a completely closed state.

2. The pet excrement collecting device capable of sealing an excrement collecting bag according to claim 1, wherein:

the end of the movable pressing rod is provided with a buckling groove, the buckling groove comprises a front groove wall and a rear groove wall, the lower end of the rear groove wall is higher than the lower end of the front groove wall, thereby forming a lower groove opening positioned at the lower end of the buckling groove and a rear groove opening positioned at the rear end of the buckling groove between the front groove wall and the rear groove wall, and the lower groove opening is inter-connected with the rear groove opening;

the elastic buckle is a lug boss which is driven by an elastic device to reciprocate upward and downward, and the elastic buckle is provided with a first guiding inclined surface that inclines to the lower rear;

when the movable pressing rod is horizontally moved to the front end of the guide rail, the elastic buckle is clamped into the buckling groove, and the movable pressing rod is clamped at the front end of the guide rail and cannot be horizontally moved along the guide rail by means of the blockage of the elastic buckle on the front groove wall.

3. The pet excrement collecting device capable of sealing an excrement collecting bag according to claim 2, wherein:

the principal body also comprises at least one baffle plate;

when the garbage collecting bin is inserted into the principal body, the baffle plate is positioned behind the movable pressing rod and can prevent the movable pressing rod from horizontally moving towards the fixed pressing rod.

4. The pet excrement collecting device capable of sealing an excrement collecting bag according to claim 3, wherein:

the garbage collecting bin comprises two elastic buckles which are respectively arranged on two sides of the front part of the garbage collecting bin;

the garbage collecting bin comprises two separating push blocks which are respectively arranged on two sides of the rear part of the garbage collecting bin;

the two ends of the movable pressing rod are respectively provided with the buckling groove;

the principal body comprises two elastic rods which are respectively arranged on two side walls of a chamber for carrying the garbage collecting bin in the principal body.

5. The pet excrement collecting device capable of sealing an excrement collecting bag according to claim 2, wherein the elastic rod comprises a first elastic rod and a second elastic rod positioned above the first elastic rod; the first elastic rod is provided with a second guiding inclined surface which is inclined forwards; the second elastic rod is provided with a third guiding inclined surface which is inclined forwards;

when the garbage collecting bin provided with the excrement collecting bag in a fully opened state is inserted into the principal body, the elastic rod is inserted into the buckle groove through the rear groove opening by virtue of the second guiding inclined surface and the third guiding inclined surface, the first elastic rod presses the elastic buckle by virtue of the first guiding inclined surface, the elastic buckle is separated from the buckling groove, and the movable pressing rod can horizontally move along the guide rail; the movable pressing rod is buckled on the principal body through the second elastic rod being clamped into the rear groove wall of the buckling groove.

6. The pet excrement collecting device capable of sealing an excrement collecting bag according to claim 5, wherein:

the principal body also comprises at least one baffle plate;

when the garbage collecting bin is inserted into the principal body, the baffle plate is positioned behind the movable pressing rod and can prevent the movable pressing rod from horizontally moving towards the fixed pressing rod.

7. The pet excrement collecting device capable of sealing an excrement collecting bag according to claim 6, wherein:

the garbage collecting bin comprises two elastic buckles which are respectively arranged on two sides of the front part of the garbage collecting bin;

the garbage collecting bin comprises two separating push blocks which are respectively arranged on two sides of the rear part of the garbage collecting bin;

the two ends of the movable pressing rod are respectively provided with the buckling groove;

the principal body comprises two elastic rods which are respectively arranged on two side walls of a chamber for carrying the garbage collecting bin in the principal body.

8. The pet excrement collecting device capable of sealing an excrement collecting bag according to claim 5, wherein:

the garbage collecting bin also comprises a separate push block; the separating push block comprises a front guiding inclined surface, a rear guiding inclined surface and a supporting surface, wherein the front guiding inclined surface is obliquely arranged forwards, the rear guiding inclined surface is obliquely arranged backwards, and the supporting surface is arranged between the front guiding inclined surface and the rear guiding inclined surface;

the first elastic rod is further provided with a fourth guiding inclined surface inclined backwards and a bearing surface arranged between the second guiding inclined surface and the fourth guiding inclined surface;

when the garbage collecting bin is drawn out of the principal body, the movable pressing rod horizontally moves along the guide rail toward the fixed pressing rod until the excrement collecting bag is in a completely closed state, and then the supporting surface of the separating push block slides to the bearing surface of the first elastic rod through the fourth guiding inclined surface and the front guiding inclined surface, so that the elastic rod is propped and taken out of the buckling groove, therefore the garbage collecting bin can be completely drawn out of the principal body;

when the garbage collecting bin is inserted into the principal body, the support surface of the separating push block slides to the bearing surface of the first elastic rod through the second guiding inclined surface and the rear guide incline surface, and the elastic rod is propped and opened by the separating push block, so that the garbage collecting bin can be smoothly inserted into the principal body.

9. The pet excrement collecting device capable of sealing an excrement collecting bag according to claim 8, wherein:
the principal body also comprises at least one baffle plate;
when the garbage collecting bin is inserted into the principal body, the baffle plate is positioned behind the movable pressing rod and can prevent the movable pressing rod from horizontally moving towards the fixed pressing rod.

10. The pet excrement collecting device capable of sealing an excrement collecting bag according to claim 9, wherein:
the garbage collecting bin comprises two elastic buckles which are respectively arranged on two sides of the front part of the garbage collecting bin;
the garbage collecting bin comprises two separating push blocks which are respectively arranged on two sides of the rear part of the garbage collecting bin;
the two ends of the movable pressing rod are respectively provided with the buckling groove;
the principal body comprises two elastic rods which are respectively arranged on two side walls of a chamber for carrying the garbage collecting bin in the principal body.

11. The pet excrement collecting device capable of sealing an excrement collecting bag according to claim 1, wherein:
the principal body also comprises at least one baffle plate;
when the garbage collecting bin is inserted into the principal body, the baffle plate is positioned behind the movable pressing rod and can prevent the movable pressing rod from horizontally moving towards the fixed pressing rod.

12. The pet excrement collecting device capable of sealing an excrement collecting bag according to claim 11, wherein:

the garbage collecting bin comprises two elastic buckles which are respectively arranged on two sides of the front part of the garbage collecting bin;
the garbage collecting bin comprises two separating push blocks which are respectively arranged on two sides of the rear part of the garbage collecting bin;
the two ends of the movable pressing rod are respectively provided with the buckling groove;
the principal body comprises two elastic rods which are respectively arranged on two side walls of a chamber for carrying the garbage collecting bin in the principal body.

13. The pet excrement collecting device capable of sealing an excrement collecting bag according to claim 1, wherein:
at least two positioning & fixing screws are arranged on the movable pressing rod;
at least two positioning & fixing screws are arranged on the fixed pressing rod;
the opening of the excrement collecting bag is provided with positioning through holes in the quantity equivalent to that of the positioning & fixing screws;
the opening edge of the excrement collecting bag is detachably arranged on the movable pressing rod and the fixed pressing rod by means of the positioning through hole sleeved on the positioning & fixing screw, so that the excrement collecting bag is detachably arranged in the garbage collecting bin.

14. The pet excrement collecting device capable of sealing an excrement collecting bag according to claim 1, wherein:
the garbage collecting bin also comprises at least one magnetic assembly; the magnetic assembly comprises a first magnetic member and a second magnetic member which can be mutually attracted together through magnetic force;
one of the movable pressing rod and the fixed pressing rod is provided with a first magnetic member, and the other is provided with a second magnetic member;
when the garbage collecting bin is removed from the principal body, the movable pressing rod horizontally moves along the guide rail towards the fixed pressing rod until the excrement collecting bag is in a completely closed state; the excrement collecting bag can be in the completely closed state by means of the magnetic assembly.

15. The pet excrement collecting device capable of sealing an excrement collecting bag according to claim 1, wherein:
at least one self-adhesive tape is arranged on that excrement collecting bag;
after the excrement collecting bag in a completely closed state is dismounted from the garbage collecting bin, the excrement collecting bag is rolled from the closed opening to the position where the self-adhesive tape is arranged, and the excrement collecting bag is sealed by the self-adhesive tape.

16. The pet excrement collecting device capable of sealing an excrement collecting bag according to claim 1, wherein:
the pet excrement collecting device comprises a cat toilet and a dog toilet.

* * * * *